United States Patent [19]

Etoh

[11] Patent Number: 4,951,208

[45] Date of Patent: Aug. 21, 1990

[54] SYSTEM FOR AUTOMATICALLY CONTROLLING VEHICLE SPEED TO DESIRED CRUISE SPEED WHOSE CONTROL FUNCTION IS INHIBITED WHEN SYSTEM FOR CONTROLLING A VEHICULAR TRACTION OPERATES AND METHOD THEREFOR

[75] Inventor: Yoshiyuki Etoh, Kanagawa, Japan

[73] Assignee: Nissan Motor Company, Limited, Yokohama, Japan

[21] Appl. No.: 261,154

[22] Filed: Oct. 24, 1988

[30] Foreign Application Priority Data

Oct. 26, 1987 [JP] Japan .................. 62-270029

[51] Int. Cl.$^5$ ............................. B60K 31/00
[52] U.S. Cl. .................. 364/426.04; 364/426.03; 180/170; 180/197
[58] Field of Search ............ 364/426.01, 426.02, 364/426.03, 426.04, 424.01; 180/197, 170, 176; 123/361, 352; 324/160, 161

[56] References Cited

U.S. PATENT DOCUMENTS

| 4,615,410 | 10/1986 | Hosaka | 180/197 |
|---|---|---|---|
| 4,736,814 | 4/1988 | Yogo et al. | 180/197 |
| 4,763,263 | 8/1988 | Leiber | 364/426.03 |
| 4,763,912 | 8/1988 | Matsuda | 180/197 |
| 4,771,850 | 9/1988 | Matsuda | 180/197 |
| 4,809,183 | 2/1989 | Eckert | 364/426.04 |
| 4,811,808 | 3/1989 | Matsumoto et al. | 180/197 |
| 4,814,991 | 7/1987 | Tada et al. | 364/426.04 |
| 4,829,438 | 5/1989 | Etoh | 364/426.04 |
| 4,833,612 | 5/1989 | Okuno et al. | 364/426.04 |
| 4,835,696 | 5/1989 | Suzuki et al. | 364/426.04 |
| 4,845,622 | 7/1989 | Suzuki et al. | 364/426.04 |
| 4,870,584 | 9/1989 | Etoh et al. | 364/426.04 |

FOREIGN PATENT DOCUMENTS 60-4428   1/1985  Japan.
61-60331  3/1986  Japan.
61-135945 6/1986  Japan.

Primary Examiner—Thomas G. Black
Attorney, Agent, or Firm—Foley & Lardner, Schwartz, Jeffery, Schwaab, Mack, Blumenthal & Evans

[57] ABSTRACT

A system and method for automatically controlling a vehicle speed to a desired cruise speed are disclosed in which an opening angle of a first throttle valve is adjusted so that the vehicle speed coincides with a target vehicle speed at which the vehicle cruises. The cruise control for the vehicle speed through the first throttle valve is inhibited when an occurrence of a slip on a drive wheel is detected and a traction control by means of a traction controlling system such that a driving force of the vehicle is reduced through a second throttle valve disposed in series with the first throttle valve in an engine intake air passage is executed so that an effective traction control can be achieved without interference of both systems when the vehicle enters on a road surface having a very low friction coefficient.

17 Claims, 4 Drawing Sheets

SYSTEM FOR AUTOMATICALLY CONTROLLING VEHICLE SPEED TO DESIRED CRUISE SPEED WHOSE CONTROL FUNCTION IS INHIBITED WHEN SYSTEM FOR CONTROLLING A VEHICULAR TRACTION OPERATES AND METHOD THEREFOR

BACKGROUND OF THE INVENTION (1) Field of the Invention

The present invention relates generally to a system for automatically controlling a vehicle speed to a desired cruise speed and a method therefor. The present invention particularly relates to the system for automatically controlling the vehicle speed to the desired cruise speed and method therefor, the system control function being inhibited when a system for controlling traction operates to suppress a slip on a drive wheel.

(2) Background of the Art

Recently, both control systems are installed together in the same vehicle, i.e., a system for automatically controlling a vehicle speed to a desired cruise speed which is effective during e.g., the vehicle travel on a freeway without operation of an accelerator pedal and a system for suppressing slips of drive wheels during travel oh a road surface having a very low friction coefficient such as a road covered with snow or ice are installed together in a vehicle.

Such individual control systems are exemplified respectively by a Japanese Patent Application First Publications (Tokkai) sho 60-4428 published on Jan. 10, 1985 and sho 61-35945 published on June 23, 1986.

The traction control systems are also exemplified by U.S. Pat. Applications Ser. No. 918,137 filed on Oct. 14, 1986. Ser. No. 918,080 filed on Oct. 14, 1986, now U.S. Pat. No. 4,763,912, and Ser. No. 918,081 filed on Oct. 14, 1986, now U.S. Pat. No. 4,711,850. The automatic vehicle speed controlling systems are also exemplified by U.S. Pat. Applications Ser. No. 057,086 filed on June 3, 1987, now U.S. Pat. No. 4,829,438, No. 109,031 filed on Oct. 16, 1987, now U.S. Pat. No. 4,845,622; No. 130,473 filed on Jan. 21, 1988, No. 146,558 filed on Jan. 21, 1988, No. 143,092 filed on Jan. 12, 1988, No. 061,295 filed on June 12, 1987, now U.S. Pat. No. 4,870,584; No. 055,516 filed on May 28, 1987, now U.S. Pat. No. 4,835,696 and No. 169,218 filed on Mar. 16, 1988.

In the vehicle in which the previously proposed automatically vehicle speed controlling system is mounted even if an accelerator pedal is placed in a fully released position (no depression of the accelerator pedal), an opening angle of a first throttle valve installed in a vehicular engine as a driving force adjusting mechanism is adjusted in accordance with a control variable outputted to a first throttle actuator so that a vehicle speed is controlled so as to coincide with a set cruise speed.

A cruise speed controller is mounted for receiving a signal derived from a tire wheel (drive wheel) speed sensor detecting a tire wheel speed of a drive wheel and outputting an acceleration/deceleration command to the actuator of the first throttle valve so that the drive wheel speed coincides with a target drive wheel speed at which the vehicle driver desires to cruise (set cruise speed). For example, if the drive wheel speed is below the target drive wheel speed, the opening angle of the first throttle valve is increased so that the vehicle driving force is accordingly increased and drive wheel speed is increased.

The cruise speed controller then starts its control function in response an actuation of a cruise set switch installed in a vehicle compartment and, on the other hand, when the set switch is released and/or a brake or a clutch pedal is depressed, the cruise control function of the cruise speed controller is immediately inhibited and released.

In addition, a second throttle valve is installed downstream of the first throttle valve and is normally placed in a fully open position. The second throttle valve is actuated by means of a second throttle actuator.

A traction controller is installed for receiving a signal derived from a sensor detecting a vehicle body speed (approximately, a driven wheel speed), a signal derived from the tire wheel speed sensor, and a signal derived from a throttle opening angle sensor detecting the opening angle of the first throttle valve , determining whether a slip occurs on the basis of the determination whether a difference between both drive wheel and vehicle body speeds is above a thresold level, and for outputting a command signal to the second actuator to close the second throttle valve in a direction toward which the second throttle valve is fully closed so that the driving force is decreased. Since the slip occurs in a case where a drive wheel torque exceeds a frictional force against a road surface, the driving force is suppressed so as not to exceed the frictional force against the road surface.

However, in a vehicle in which both systems described above are mounted, since both the cruise speed controller and the traction controller carry out independent controls for the driving force from each other, both controls are often interfere with each other under certain running conditions.

FIGS. 5 (A) to 5 (C) illustrate characteristic graphs caused by the previously proposed systems when the vehicle enters on a road surface of an ascending slope having a gradient of, e.g., 3% and having a low friction coefficient, e.g., $\mu=0.1$ with the cruise controller operated. As shown in FIGS. 5(a) to 5(C) the drive wheel speed and vehicle body speed deviate from each other due to the occurrence of slip during an interval of time from approximately 10 seconds to approximately 30 seconds after the run on the above-described road surface. Therefore, the traction controller operates in response to the deviation of both drive wheel and vehicle body speeds so as to largely close the second throttle valve so that the drive wheel torque does not exceed the road surface frictional force.

On the other hand, since the tire wheel speed becomes reduced below the target vehicle speed in FIGS. 5(A) to 5(C)) due to the reduced driving force, the cruise controller is operated to open the first throttle valve so as to return the drive wheel speed to the target vehicle speed.

In the method described above, interference occurs due to the opening of the one throttle valve and closing of the other throttle valve. For example, the slip can pe suppressed by a slight closure of the second throttle valve in a case where the first throttle valve is largely closed. However, in a case where the first throttle valve is largely open, the second throttle valve needs to be largely closed to reduce the driving force to the same magnitude. In addition, since the vehicle runs win a transient state immediately after the vehicle enters on the low frictional road surface from a normal high frictional road surface the it is difficult to accurately determine an opening angle through which the throttle valve is closed in good response, with a relationship to the control speed of the traction controller taken into consideration, and the effect of slip suppression may be deteriorated.

Hence, the traction control needs to have a higher priority than the cruise control when the vehicle runs on a low frictional road surface on which a steering force of a steering wheel when the vehicle steering wheel is operated is lost and on which a steering holding force midway through the steering operation is lost. In addition, it is desirable to temporarily halt the operation of the cruise controller when the vehicle runs on such a low frictional road surface in order not to impair the effect of the traction control.

Since the intake air quantity is determined according to a position at which a cross sectional area of an air flow passage becomes minimum by means of either of the pair of throttle valves in such a case where the two throttle valves are disposed in series with each other, the control by means of the traction controller after the wide close of the second throttle valve is predominated. Therefore, although the control of the cruise speed controller can be neglected, the unncessary operation of the first throttle valve provides a cause of increase of wear-out of a sliding portion of the first throttle valve.

SUMMARY OF THE INVENTION

It is an object of the present invention to provide a system and method for automatically controlling a vehicle speed to a desired vehicle speed which can avoid an interference with a system and method for controlling vehicular traction.

It is another object of the present invention to provide a system and method for automatically controlling a vehicle speed to a desired cruise speed which can assure a suppression of a slip on a drive wheel against a road surface by means of a system for controlling a vehicular traction with the automatic cruise control function temporarily halted when the vehicle runs on a road surface having a low friction coefficient such as a road surface covered with snow or ice.

It is still another object of the present invention to provide a system and method for automatically controlling a vehicle speed to a desired vehicle speed in which during the operation of a traction controlling system, the cruise control by means of the automatic vehicle speed controlling system is inhibited and unnecessary drive for an engine throttle valve from the automatic vehicle speed controlling system can be avoided.

The above-described objects can be achieved by providing a system for a vehicle, comprising: (a) first means for detecting a vehicle speed; (b) second means through which the current vehicle speed is set as a cruise speed at which a vehicle driver desires to cruise; (c) third means responsive to the set of the cruise speed through the second means for outputting a speed control command so that the vehicle speed coincides with the set cruise speed; (d) fourth means for adjusting a driving force of the vehicle according to the speed command from the third means, (e) fifth means for detecting whether a slip on a drive wheel of the vehicle occurs; (f) sixth means for outputting a speed reduction command when the occurrence of slip is detected by the fifth means; (g) seventh means for reducing the driving force according to the speed reduction command derived from the sixth means, and (h) eighth means for inhibiting the output of the speed control command to the fourth means when the occurrence of the slip is detected by the fifth means.

The above-described objects can also be achieved by providing a system for a vehicle, comprising: (a) first means for detecting a speed of a vehicular drive wheel; (b) second means through which the current drive wheel speed is set as a cruise speed at which a vehicle driver desires to cruise; (c) third means, including a first actuator, responsive to the set of the cruise speed through the second means for receiving the drive wheel speed information from the first means and for outputting a first actuation command to the first actuator so that the drive wheel speed coincides with the set cruise speed, the first actuator actuating a first vehicle driving force adjusting mechanism; (d) fourth means for detecting a variable determining the vehicle driving force from the first driving force adjusting mechanism; (e) fifth means for detecting a vehicle body speed; (f) sixth means, including a second actuator, for receiving the drive wheel speed information from the first means, the variable information from the fourth means, and the vehicle body speed information from the fifth means and for outputting a second actuation command to the second actuator so as to reduce the driving force when a difference between the drive wheel speed and vehicle body speed exceeds a predetermined value, the second actuator actuating a second vehicular driving force adjusting mechanism, the sixth means outputting an interrupt signal to the third means so as to cancel the output of the first actuation command signal to the third means when outputting the second actuation signal.

The above-described objects can also be achieved by providing a method for controlling a driving force of a vehicle, comprising the steps of: (a) detecting a vehicle speed; (b) providing switch means through which the current vehicle speed is set as a cruise speed at which a vehicle driver desires to cruise and setting the cruise speed through the switch means; (c) outputting a speed control command when the set of the cruise speed through the switch means in the step (b) so that the vehicle speed coincides with the set cruise speed: (d) adjusting a driving force of the vehicle according to the speed control command outputted in the step (c); (e) detecting occurrence of a slip on a drive wheel of the vehicle, (f) outputting a speed reduction command when the occurrence of the slip is detected in the step (e); (g) reducing the driving force according to the speed reduction command outputted in the step (f), and (h) inhibiting the output of the speed control command in the step (d) when the occurrence of the slip is detected in the step (e).

DETAILED DESCRIPTION OF THE PREFERRED EMBODIMENT

Reference will hereinafter be made to the drawings in order to facilitate understanding of the present invention.

Figure 1:
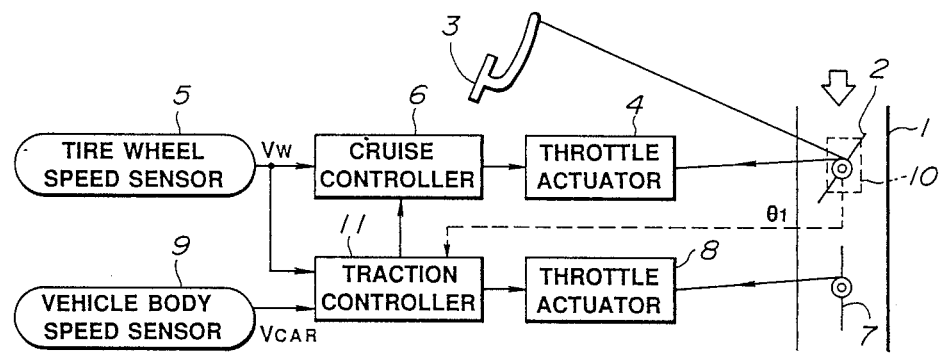
FIG. 1 is a schematic circuit block diagram of a system for automatically controlling a vehicle speed to a desired cruising speed cooperating with a system for controlling vehicluar traction in a preferred embodiment according to the present invention.

FIG. 1 shows a preferred embodiment of a system for automatically controlling a vehicle speed to a desired cruising speed executed together with a system for controlling vehicular traction.

Figure 5A:
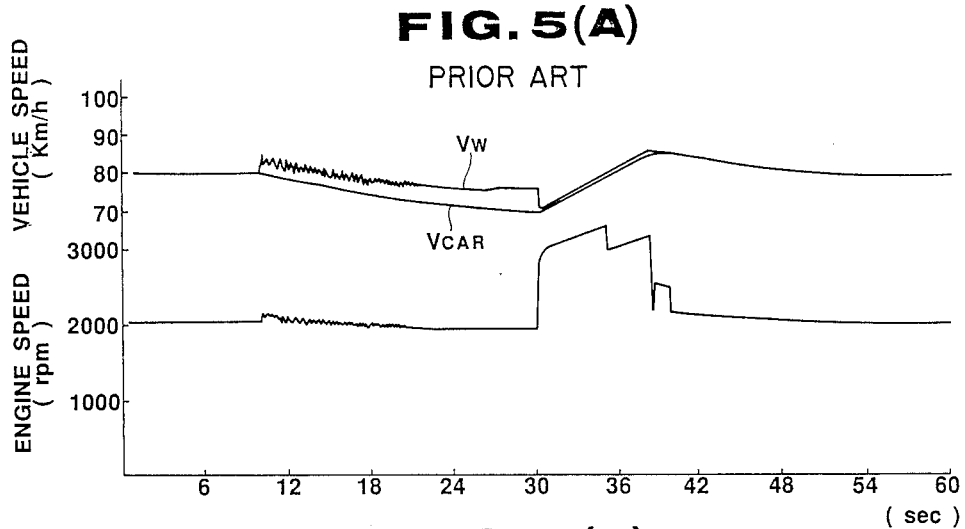
FIGS. 5 (A) to 5 (C) are waveform charts of the systems for explaining the operations of previously proposed systems.
Figure 5B:
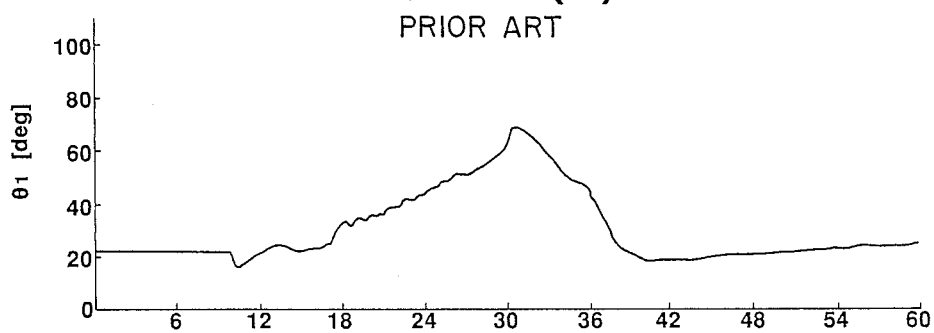
Figure 5C:
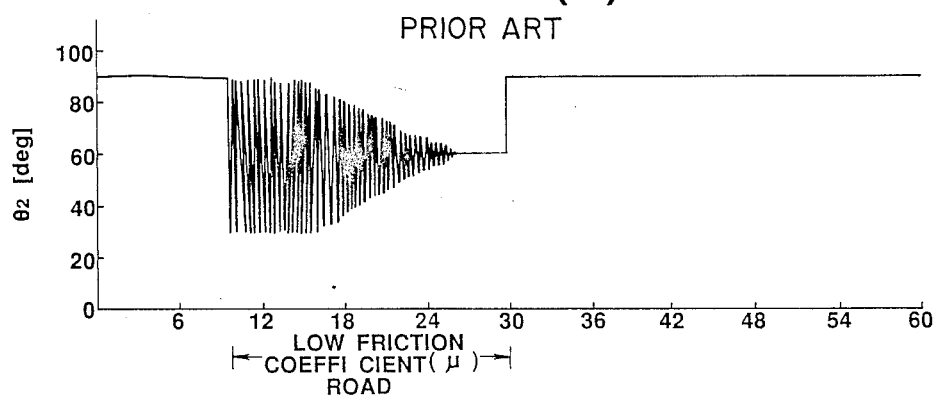

It is noted that the operation of a previously proposed automatic cruising speed controlling system is already explained in the Background of the Art with reference to FIGS. 5 (A) to 5 (C).

In FIG. 1, a cruise controller 6 receives an input signal indicative of a tire wheel (drive wheel) speed sensor 5 detecting a tire wheel speed $V_w$. A throttle actuator 4 receives a cruise command signal from the cruise controller 6 so as to adjust an opening angle of a first throttle valve 2 installed in an intake air passage 1 of a vehicular engine. The constructions of the above-described controller 6 and throttle actuator 4 are exemplified by U.S. Pat. Applications ser. No. 055,516 filed on May 29, 1987, now U.S. Pat. No. 4,835,696, No. 061,295 filed on June 12, 1987, now U.S. Pat. No. 4,820,584, and No. 169,218 filed on Mar. 16, 1988. The disclosure of these United States Patent Applications are hereby incorporated by reference.

A traction controller 11 receives a signal indicative of a vehicle body speed from a vehicle body speed sensor 9, the tire wheel speed signal $V_w$ from the tire wheel speed sensor 5, and a signal indicative of an opening angle $\theta_1$ from a first throttle valve opening angle sensor 10. The traction controller 11 outputs a command signal to a second actuator 8 to adjust an opening angle of a second throttle valve 7 installed at a downstream of the first throttle valve 2. The second actuator 8 comprises, e.g., a stepping or DC motor. The structure of the second throttle valve actuator 8 is exemplified by a Japanese Patent Application First Publication (Tokkai) sho 61-60331 published on Mar. 28, 1986, the disclosure of which is hereby incorporated by reference. The traction controller 11 receives a signal indicative of the opening angle $\theta_1$ of the first throttle valve 2. Furthermore, the traction controller 11 outputs an inhibit signal to the cruise controller 6 as will be described later.

Figure 2:
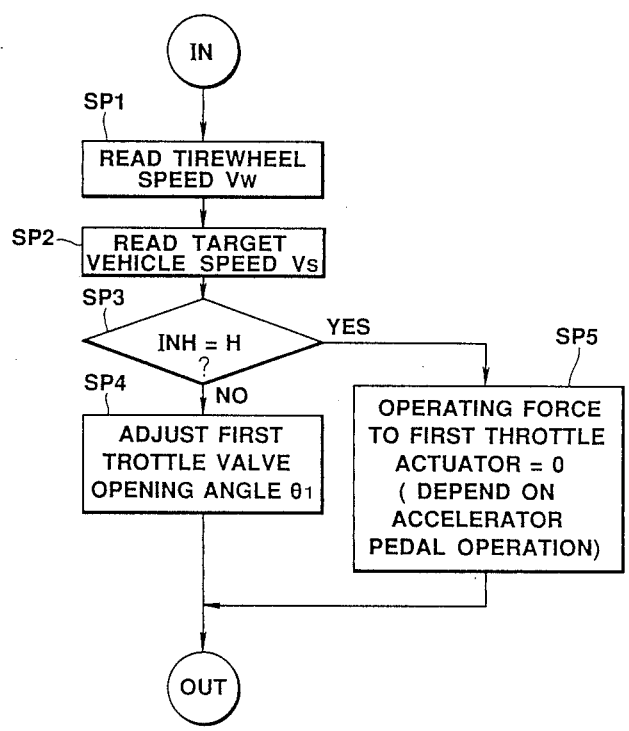
FIG. 2 is an operational flowchart of the system for automatically controlling the vehicle speed to the desired cruising speed shown in FIG. 1.
Figure 3:
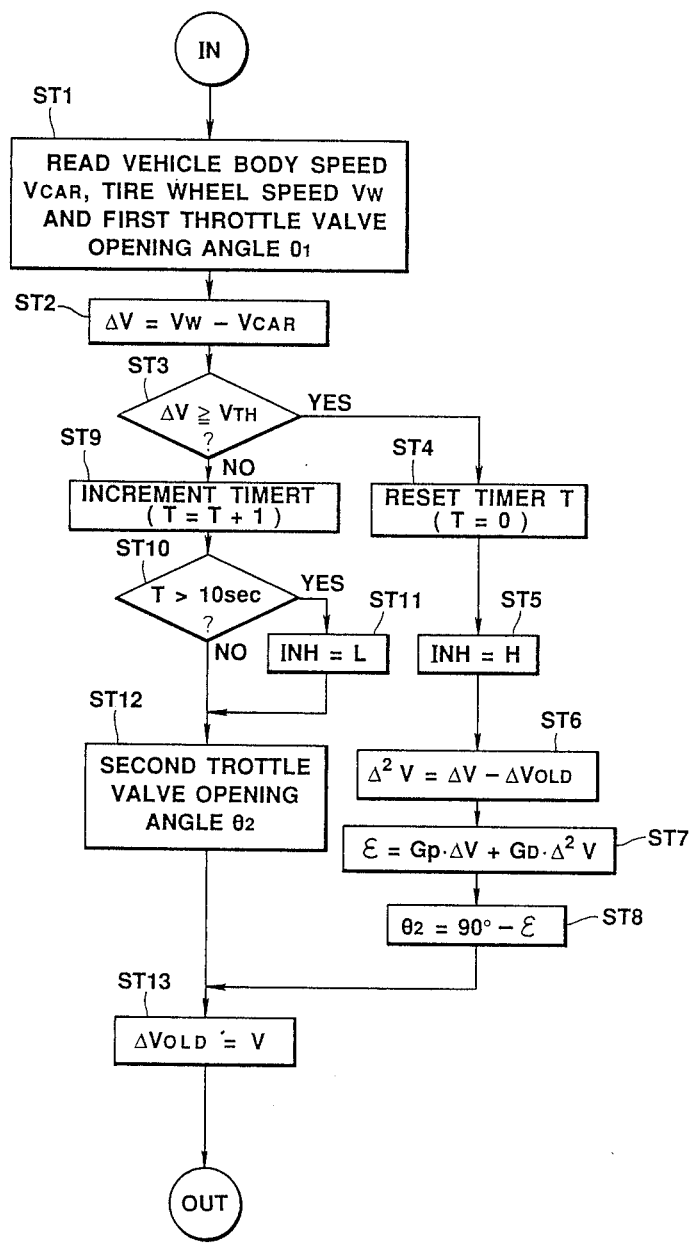
FIG. 3 is an operational flowchart of the system for controlling the traction shown in FIG. 1.

FIGS. 2 and 3 show control routines executed in the respective controllers 6 and 11.

The routines shown in FIGS. 2 and 3 are repeated for respective control periods ( for each 10 msec. in the case of the cruise control and for each 5 msec. in the case of the traction control).

(i) Cruise Control

The cruise control is such that the tire wheel speed $V_w$ coincides with a target vehicle speed $V_s$ at which the vehicle cruises. If the tire wheel speed $V_w$ does not coincide with the target vehicle speed $V_s$, the opening angle $\theta_1$ of the first throttle valve 2 is adjusted in steps SP1 to SP4.

(ii) Traction control

When the traction controller 11 receives the signals of $V_{CAR}$, $V_w$, and $\theta_1$ from the sensors 5, 9, and 10, the difference between both speeds delta V ($\Delta V$) (delta V $= V_w - V_{CAR}$) is compared with a predetermined value $V_{TH}$ (,e.g., 5 Km/h) so as to determine the occurrence of a slip in steps ST1 to ST3. It is noted that the read opening angle $\theta_1$ of the first throttle valve 2 is used to determine the occurrence of vehicle acceleration for the traction control execution.

(a) delta $V \geq V_{TH}$

This is a case where slip occurs. This causes the second throttle valve 7 to close to reduce a driving wheel torque so that the drive wheel torque does not exceed a road surface frictional force. In FIG. 3, a feedback quantity epsilon ($\epsilon$) is calculated in a step ST7 by means of a proportional-differential operation shown in equation (1) with delta V as a difference.

$$\text{epsilon} = G_P \times \text{delta V} + G_D \times \text{delta}^2 V \qquad (1)$$

, wherein $G_P$ and $G_D$ denote a proportional gain (constant) and differential gain (constant). In addition, delta$^2$ V denotes a quantity of change of delta V expressed in the following equation (2) per unit period and calculated in a step ST6.

$$\text{delta}^2 V = \text{delta V} - \text{velta VOLD} \qquad (2)$$

In addition, delta VOLD denotes delta V before one control period. The presently derived delta V is stored as delta VOLD in a step ST13 so as to enable its retrieval at the next control period.

Then, epsilon is negatively fedback in the equation (3) and the opening angle $\theta_2$ of the second thrttole valve 7 is determined in a step ST8.

$$\theta_9 = 90° - \text{epsilon} (\epsilon) \qquad (3)$$

Since larger slip occurs as epsilon becomes large delta V becomes large or delta$^2$ V becomes large), the second throttle valve 7 is operated from the fully open position ($\theta_2 = 90°$) to a fully closed position ($\theta_2 = 0°$) so that the driving force is reduced.

(b) delta V $< V_{TH}$

In this case, no slip occurs and the vehicle runs on a high frictional road surface. Hence, there is no need to close the second throttle valve 7, the epsilon equals to zero, and the second throttle valve 7 is held to the fully open position ($\theta_2 = 90°$ in steps ST3 and ST12.

It is noted that a problem of hunting occurs in the case of switching control with the value of $V_{TH}$ as a reference as the matter of practice. Once a flag (INH) rises, a predetermined holding interval (for 10 seconds) is provided so that the flag is not fallen even if delta V $< V_{TH}$ to avoid hunting in steps ST4, ST9, and ST10.

(iii) Association Control

The traction control is activated when delta $V \geq V_{TH}$. When the cruise speed control is simulataneously carried out, both controls are overlapped and interference occurs.

To cope with such interference, the steps SP3, SP5, ST5, and ST11 are inserted in FIGS. 2 and 3.

That is to say, in FIG. 3, the inhibit flag (INH) rises when delta $V \geq V_{TH}$ in the steps ST3 and ST5 and in the cruise control of FIG. 2, the cruise controller 6 determines whether the flag rises and does not output the command signal to the first actuator 4 so that no actuating force to the first throttle valve 2 is transmitted to the first throttle valve 2 when the flag does not rise in steps SP3 and SP4. For example, when the set switch is turned on, the cruise speed control and set switch are immediately released. Thus, this means that a condition to halt the cruise speed control is added.

It is noted that the rise of the flag means that a signal indicating the flag level is turned to a high level (the flag rises) and is expressed as [H] and the signal indicating the flag level is turned to a low level (the flag falls) and is expressed as [L].

Next, an operation of the cruise and traction controllers will be described in a case where the vehicle enters a the low frictional road surface with the cruise controller 6 operated.

In this case, at the same time when the traction controller 11 is operated, the cruise speed controller 6 is automatically released. Consequently, even though the speed $V_W$ is below $V_s$, the opening angle of the first throttle valve 2 remains unchanged unless the vehicle driver depresses the accelerator pedal 3.

In this case, if the first throttle valve 2 is freely opened regardless of the second throttle valve 7, an intake air quantity passing through the first throttle valve 2 is varied. Therefore, a reduction quantity of the intake air contributing to the reduction of the driving force due to the reduction of the opening angle of the second throttle valve 7 becomes different. Consequently, it is difficult to carry out the proportional-differential operation in a good response so that accurate slip prevention cannot be carried out.

On the other hand, when the accelerator pedal 3 is not operated by the driver and the opening angle of the throttle valve 2 is held constant, the intake air quantity passing through the first throttle valve 2 is fixed. When the proportional-differential operation with delta V as the difference is carried out, its operation becomes stable and slip suppression is effectively carried out. In other words, since there is associative control between the cruise speed controller 6 and traction controller 11, i.e., the slip occurrence on the low frictional road surface, the cruise speed control is inhibited and the control of traction is ensured.

Figure 4A:
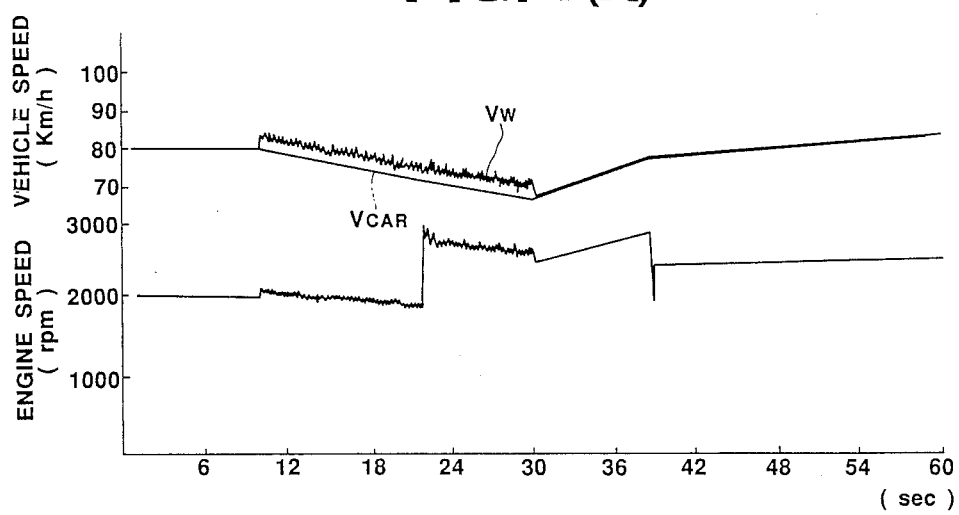
FIGS. 4 (A) to 4 (C) are waveform charts of the systems shown in FIGS. 1 to 3 for explaining the operations of the systems.
Figure 4B:
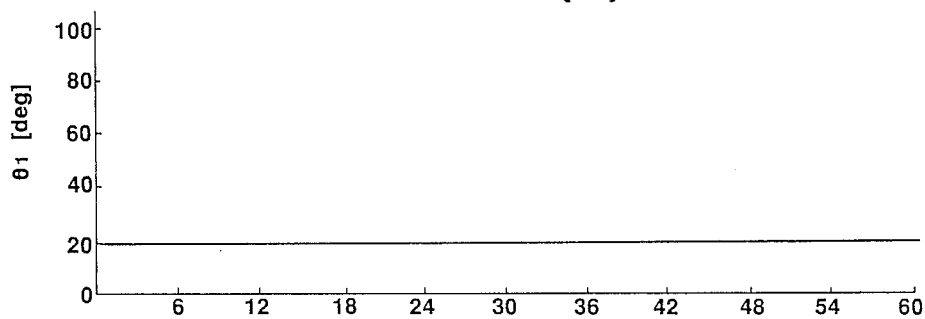
Figure 4C:
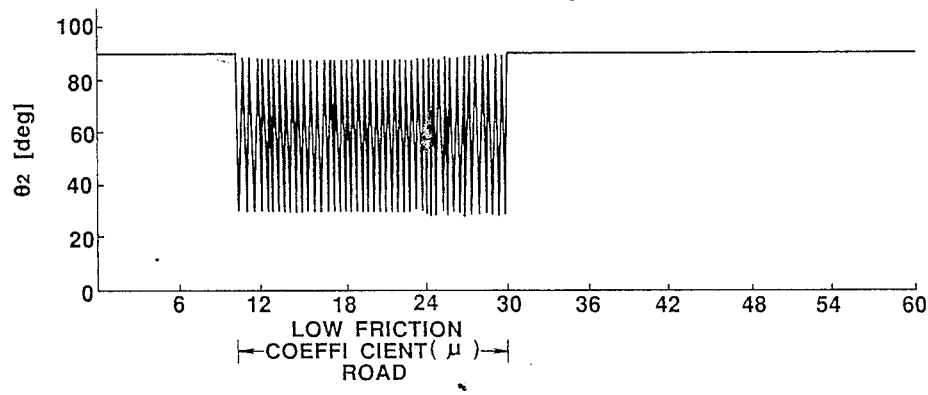

FIGS. 4 (A) to 4 (C) show waveform charts of the characteristics in a case when the vehicle enters on the same situation as in the case of FIGS. 5 (A) to 5 (C).

As shown in FIGS. 4 (A) to 4 (C), the opening angle $\theta_2$ of the second throttle valve 7 is not changed under the influence of that of the first throttle valve 2 as in the case shown in FIGS. 4 (A) to 4 (C) and is transferred through the same drive width.

In addition, since at this time the cruise speed controller 6 is not unnecessarily operated to drive the first throttle valve 2, a wear-out of the sliding part of the throttle valve 2 can be reduced.

Since the associative control can easily be achieved with a microcomputer, the controllers 6 and 11 can be intergrated in the microcomputer.

As described hereinabove, since, in the system and method for automatically controlling the vehicle speed to the desired cruising speed in which the speed control command signal is outputted so that the vehicle speed coincides with the desired target vehicle speed and the speed reduction command signal to reduce the driving force is outputted, means such that the output of the speed control command signal is inhibited when the slip occurs is provided so that the interference between both controls can be avoided and effective slip suppression is ensured.

It will fully be appreciated by those skilled in the art that the foregoing description is made in terms of the preferred embodiment and various changes and modifications may be made without departing from the scope of the present invention which is to be defined by the appended claims.

What is claimed is:
1. A system for a vehicle, comprising:
 (a) first means for detecting a vehicle speed;
 (b) second means through which the current vehicle speed is set as a cruise speed at which a vehicle driver desires to cruise;
 (c) third means responsive to the set of the cruise speed through the second means for outputting a speed control command so that the vehicle speed coincides with the set cruise speed;
 (d) fourth means for adjusting a driving force of the vehicle through a first engine driving force adjusting mechanism according to the speed command from the third means;
 (e) fifth means for detecting whether a slip on a drive wheel of the vehicle occurs;
 (f) sixth means for outputting a speed reduction command when the occurrence of slip is detected by the fifth means;
 (g) seventh means for reducing the driving force through a second engine driving force adjusting mechanism according to the speed reduction command derived from the sixth means; and
 (h) eighth means for inhibiting the output of the speed control command to the fourth means when the occurrence of the slip is detected by the fifth means.

2. A system as set forth in claim 1, wherein said first engine driving force adjusting mechanism comprises a first throttle valve installed in an intake air passage of a vehicular engine, and wherein the opening angle of said first throttle valve is variable.

3. A system as set forth in claim 1, wherein said second engine driving force adjusting mechanism comprises a second throttle valve installed in an intake air passage of a vehicular engine, and wherein the opening angle of said second throttle valve is variable.

4. A system as set forth in claim 1, wherein said first engine driving the force adjusting mechanism comprises a first throttle valve installed in an intake air passage of a vehicular engine, and said second engine driving force adjusting mechanism comprises a second throttle valve installed in an intake air passage of said vehicular engine in series with said first throttle valve, and wherein the opening angles of said first and second throttle valves are variable.

5. A system for a vehicle, comprising:
 (a) first means for detecting a speed of a vehicular drive wheel;
 (b) second means through which the current drive wheel speed is set as a cruise speed at which a vehicle driver desires to cruise;
 (c) third means, including a first actuator, responsive to the set of the cruise speed through the second means for receiving the drive wheel speed information from the first means and for outputting a first actuation command to the first actuator so that the drive wheel speed coincides with the set cruise speed, the first actuator actuating a first vehicle driving force adjusting mechanism;
 (d) fourth means for detecting a variable determining the vehicle driving force from the first driving force adjusting mechanism;
 (e) fifth means for detecting a vehicle body speed;
 (f) sixth means, including a second actuator, for receiving the drive wheel speed information from the first means, the variable information from the fourth means, and the vehicle body speed information from the fifth means, and for outputting a second actuation command to the second actuator so as to reduce the driving force when a difference between the drive wheel speed and vehicle body speed exceeds a predetermined value, the second actuator actuating a second vehicular driving force adjusting mechanism, the sixth means outputting an interrupt signal to the third means so as to cancel the output of the first actuation command signal to the third means when outputting the second actuation signal.

6. A system as set forth in claim 5, wherein the sixth means calculates a difference between the drive wheel speed and vehicle body speed, compares the difference with the predetermined value so as to detect the occurrence of a slip on the drive wheel, and calculates a variable determining the reduction of speed through the second driving force adjusting mechanism on the basis of the speed difference, a difference between the current speed difference and a previous speed difference one control period before.

7. A system as set forth in claim 6, wherein the sixth means calculates the variable $\theta_2$ in the following equation:

$$\theta_2 = 90° - (G_p \times \text{delta } V + G_D \times \text{delta}^2 V), \text{ in}$$

the equation $G_p$ denotes a proportional gain, $G_D$ denotes a differential gain, delta V denotes the speed difference, and delta$^2$ V is expressed as delta V-delta VOLD, and delta VOLD denotes delta V one control period before.

8. A system as set forth in claim 7, wherein the variable of the second driving force adjusting mechanism is set to 90° when no occurrence of slip is detected by the sixth means.

9. A system as set forth in claim 9, wherein the first and second driving force adjusting mechanisms are first and second throttle valves installed in an intake air passage of a vehicular engine, opening angles of both throttle valves being the variables.

10. A system as set forth in claim 6, wherein the output of the first actuation command signal from the third means to the first actuator is carried out after a predetermined delay upon the detection of the difference of speed below the predetermined value after the sixth means outputs the second actuation command to the second actuator so as to reduce the drive force.

11. A system as set forth in claim 10, wherein the predetermined delay is 10 seconds.

12. A system as set forth in claim 5, wherein the predetermined value is 5 Km/h.

13. A system as set forth in claim 5, wherein the third and sixth means are constituted by a single microcomputer except the first and second actuators.

14. A method for controlling a driving force of a vehicle, comprising the steps of:
(a) detecting a vehicle speed;
(b) providing switch means through which the current vehicle speed is set as a cruise speed at which a vehicle driver desires to cruise and setting the cruise speed through the switch means;
(c) outputting a speed control command when the cruise speed is set through the switch means in the step (b) so that the vehicle speed coincides with the set cruise speed;
(d) adjusting a driving force of the vehicle through a first engine driving force adjusting mechanism according to the speed control command outputted in the step (c);
(e) detecting occurrence of a slip on a drive wheel of the vehicle;
(g) outputting a speed reduction command when the occurrence of the slip is detected in the step (e);
(g) reducing the driving force through a second engine driving force adjusting mechanism according to the speed reduction command outputted in the step (f); and
(h) inhibiting the output of the speed control command in the step (d) when the occurrence of the slip is detected in the step (e).

15. A method as set forth in claim 14, wherein said step of adjusting a driving force of the vehicle through said first engine driving force adjusting mechanism comprises adjusting the angle of a first throttle valve installed in an intake air passage of a vehicular engine.

16. A method as set forth in claim 14, wherein said step of adjusting a driving force of the vehicle through said second engine driving force adjusting mechanism comprises adjusting the angle of a second throttle valve installed in an intake air passage of a vehicular engine.

17. A method as set forth in claim 14, wherein said step of adjusting a driving force of the vehicle through said first engine driving force adjusting mechanism comprises adjusting the angle of a first throttle valve installed in an intake air passage of a vehicular engine, and said step of adjusting a driving force through said second engine driving force adjusting mechanism comprises adjusting the angle of a second throttle valve installed in an intake air passage of said vehicular engine in series with said first valve.

* * * * *